May 4, 1954     E. C. PICKARD     2,677,572
VEHICLE BODY WINDCORD AND TRIM MOUNTING MEANS

Filed Jan. 24, 1951     2 Sheets-Sheet 1

E. C. PICKARD
INVENTOR.

BY
ATTORNEYS

May 4, 1954     E. C. PICKARD     2,677,572
VEHICLE BODY WINDCORD AND TRIM MOUNTING MEANS
Filed Jan. 24, 1951     2 Sheets-Sheet 2
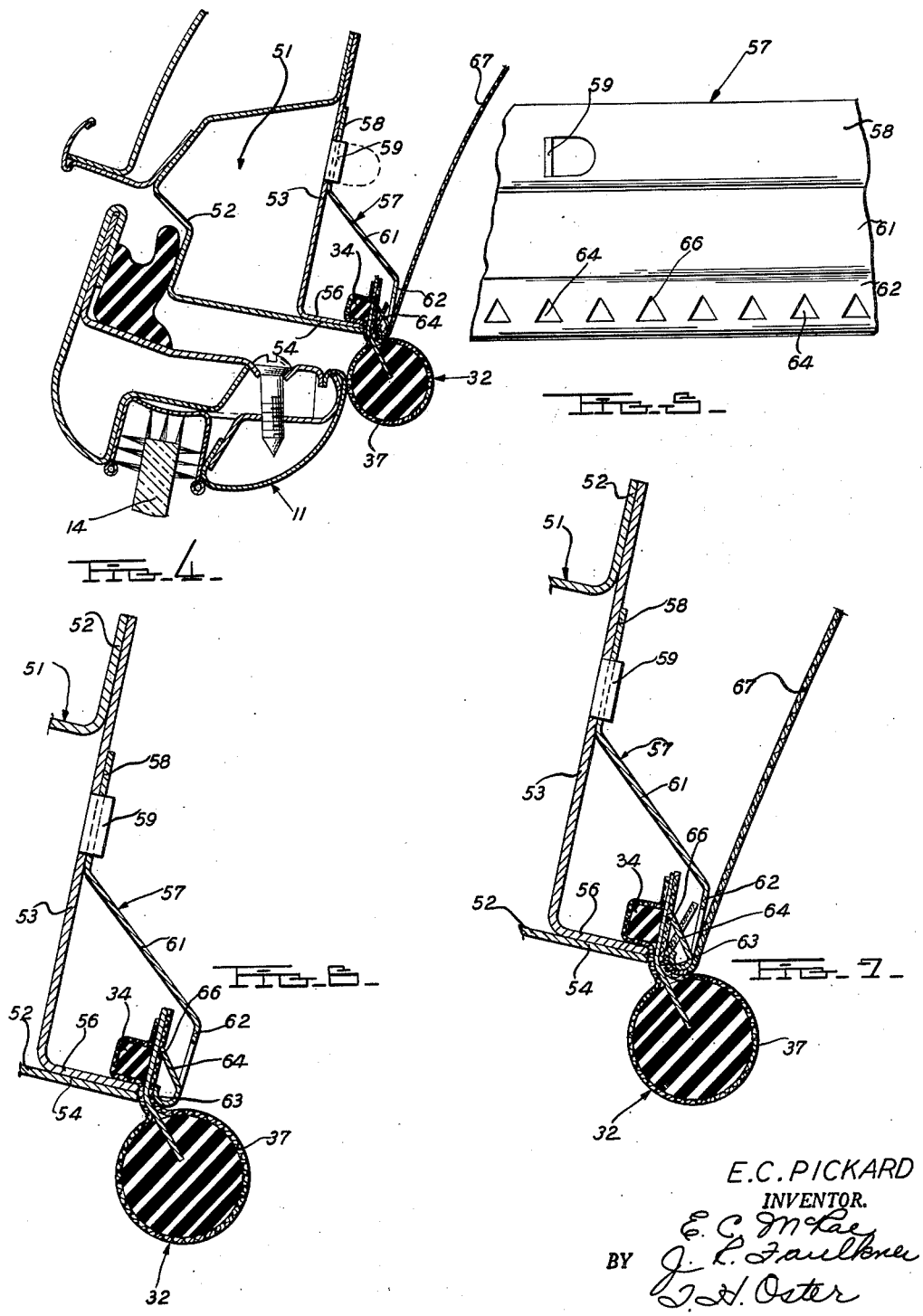
E.C. PICKARD
INVENTOR.
BY
ATTORNEYS Patented May 4, 1954

2,677,572

UNITED STATES PATENT OFFICE 2,677,572

VEHICLE BODY WINDCORD AND TRIM MOUNTING MEANS

Edwin C. Pickard, Detroit, Mich., assignor to Ford Motor Company, Dearborn, Mich., a corporation of Delaware Application January 24, 1951, Serial No. 207,513

1 Claim. (Cl. 296—28)

This invention relates generally to a vehicle body construction, and particularly to the mounting of the windcord and trim material on the body.

An object of the present invention is to provide a vehicle body construction in which a windcord or weather strip is positively held in place adjacent a door opening in such manner as to facilitate the assembly of the structure and to provide an economical manufacture. A windcord having an enlarged cylindrical sealing portion formed of resilient material and a smaller beaded portion spaced from the sealing portion and connected thereto by suitable webbing is clamped against an inwardly extending flange of the body structure by a continuous metal clamping strip provided with holes registering with tabs struck up from a body member. The marginal edge of the clamping strip is positioned adjacent the windcord and clamps the latter in place.

A further object of the present invention is to provide a vehicle body construction in which a windcord is positively held in place adjacent a door opening by means of a continuous metal clamping strip and in which the clamping strip is provided with means for engaging and anchoring the edge portions of the fabric headlining of the vehicle. In an embodiment of the invention this is accomplished by providing a rolled edge on the clamping strip engageable with the windcord to clamp it in place and also to form a curved surface around which the headlining may be wrapped. A series of closely spaced barbs are carried by the clamping strip and provide anchoring means for the headlining. With this construction the headlining may be readily tucked between the clamping strip and the windcord and will automatically interlock with the anchoring barbs.

Other objects and advantages of this invention will be made more apparent as this description proceeds, particularly when considered in connection with the accompanying drawings, wherein:

Figure 1 is a side elevational view of a portion of a passenger car embodying the present invention.

Figures 2, 3 and 4 are enlarged cross sectional views taken on the lines 2—2, 3—3 and 4—4 of Figure 1.

Figure 5 is an elevational view of the clamping strip shown in Figure 4.

Figure 6 is an enlarged fragmentary cross sectional view similar to a portion of Figure 4 prior to the assembly of the headlining thereto.

Figure 7 is a cross sectional view similar to Figure 6 but showing the headlining in place.

Figure 1:
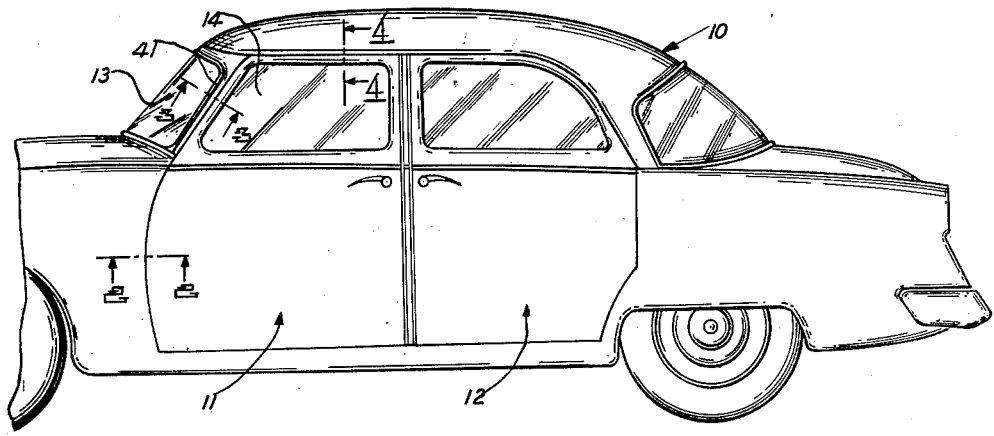

Referring now to Figure 1 of the drawings, the reference character 10 indicates a motor vehicle of the fordor type having front and rear doors 11 and 12, a windshield 13 and a front window 14.

Figure 2:
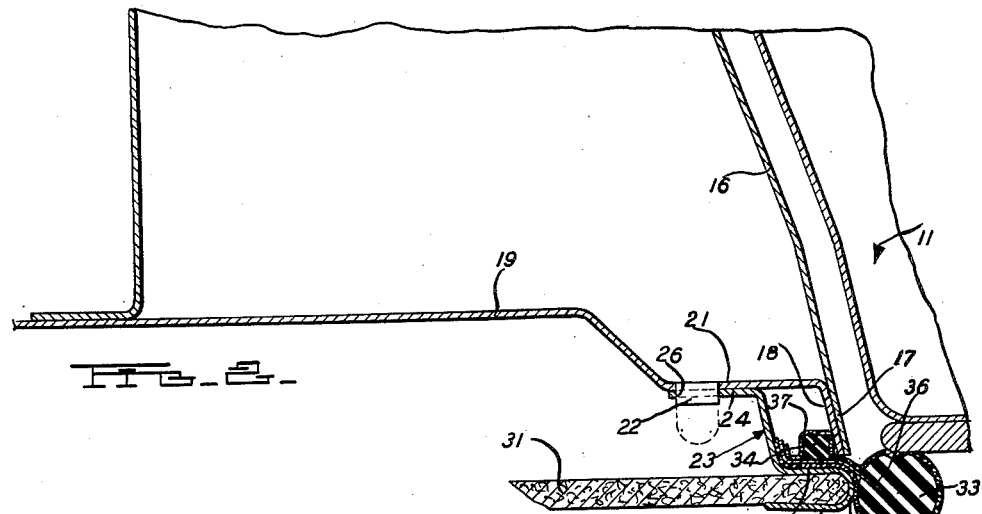

With reference now to Figure 2, the reference character 16 indicates a vertically extending structural body member adjacent the forward edge of the front door opening. This member terminates in an inwardly extending marginal flange 17 positioned adjacent and welded to an inwardly extending marginal flange 18 of a generally longitudinally extending inner body panel 19. The inner panel 19 has an offset portion 21 provided with a plurality of vertically spaced tabs 22. A continuous metal clamping strip 23 is formed with a base flange 24 adjacent the flange 21 and with a series of holes 26 registering with and receiving the tabs 22. After assembly the tabs are bent over to clamp the strip 23 to the body structure. The clamping strip 23 has an inwardly offset flange 27 and a still further inwardly offset return bend flange 28 interconnected by a rolled portion 29. The flanges 27 and 28 are spaced a suitable distance to receive the rearward edge of a trim panel 31.

A windcord 32 is mounted upon the body structure for cooperation with the adjacent edge of the front door 11 to form a seal therewith. The windcord comprises a cylindrical sealing portion 33 formed of a resilient material such as sponge rubber and a smaller beaded portion 34 formed of a less resilient material such as hard rubber or suitable cording. The beaded portion 34 is spaced from the cylindrical portion 33 and is suitably connected thereto by means hereafter described.

An inner reinforcing strip 36 formed of relatively stiff cording reinforced with wire has one end embedded in the cylindrical sealing portion 33 of the windcord and the other end in engagement with one edge of the beaded portion 34. The reinforcing strip 36 extends a short distance beyond the beaded portion. A fabric cover 37 surrounds the cylindrical sealing portion 33, the beaded portion 34 and the reinforcing strip 36, being suitably cemented or otherwise secured thereto.

During assembly the windcord 32 is positioned adjacent the marginal edges of the flanges 17 and 18 with the beaded portion 34 on one side of the flanges and the cylindrical sealing portion 33 on the opposite side thereof. The clamping strip 23 is next assembled to the body structure and held in position by the tabs 22. It will be apparent that in the assembled relationship of the parts the flange 27 of the clamping strip serves to clamp the windcord to the marginal flanges 17 and 18 of the body structure thus eliminating the necessity for a separate tacking strip and also eliminating the labor involved in tacking the windcord to such a strip.

Figure 3:
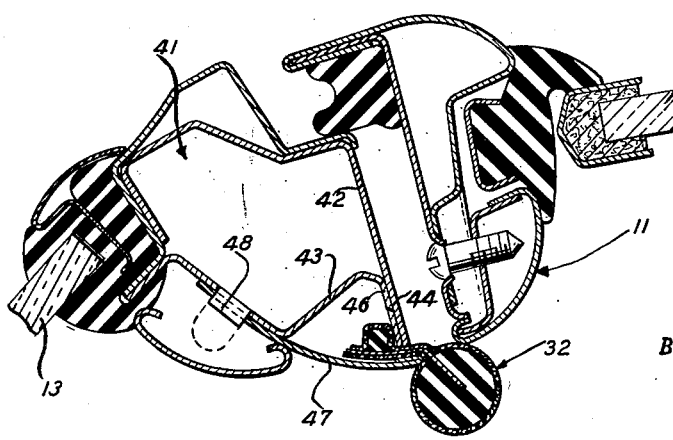

Figure 3 illustrates the windcord mounting arrangement at the windshield pillar 41 located between the windshield 13 and the front door 11. Here the pillar includes structural members 42 and 43 terminating in juxtaposed inwardly extending marginal flanges 44 and 46 respectively. The windcord 32 is positioned adjacent these flanges and is held in place by means of a clamping strip 47 which in turn is mounted upon the body member 43 by means of tabs 48 struck out therefrom and passing through apertures in the clamping strip.

Reference is now made to Figure 4 which shows the mounting arrangement for the windcord adjacent the roof rail 51. The roof rail 51 is formed of an outer channel shaped member 52 and an inner member 53 closing the open side of the channel. The members 52 and 53 are provided with inwardly extending marginal flanges 54 and 56 respectively against which the marginal edges of which the windcord 32 is positioned. The windcord is clamped against the edges of the flanges 54 and 56 by means of a clamping strip 57 having a base 58 provided with holes for receiving tabs 59 struck out from the body member 53 and bent over to secure the clamping strip in place. The clamping strip 57 has an intermediate downwardly and inwardly inclined portion 61 and a downwardly extending marginal flange 62. It will be seen that the marginal flange 62 is offset a short distance inwardly from the inner marginal edges of the flanges 54 and 56 of the roof rail. The flange 62 terminates at its lower edge in a rolled edge 63 closely adjacent the edges of the flanges 54 and 56 and serving to clamp the connecting webbing of the windcord 32 against these flanges.

As best seen in Figure 5, a plurality of triangular barbs 64 are struck out from the flange 62 of the clamping strip 57 and, as best seen in Figure 6, are bent outwardly into engagement with the windcord adjacent the beaded portion 34 thereof with the pointed upper ends 66 of the barbs contactng the fabric covering 37 of the windcord.

Referring now to Figure 7, the fabric headlining 67 forming the interior covering for the vehicle roof is wrapped around the rolled edge 63 of the flange 62 of the clamping strip 57 and extends upwardly between the beaded portion of the windcord and the pointed barbs 64. The barbs pierce the headlining and serve to anchor it in place. The assembly of the headlining is facilitated by reason of the resilience of the windcord construction and mounting. The cylindrical sealing portion 33 of the windcord can readily be bent outwardly permitting the headlining to be pushed around the rolled edge 63 of the clamping strip by means of a suitable tool resembling a blunt edged putty knife. In addition the resilience of the portion of the windcord above the marginal flanges 54 and 56 permits the headlining to be pushed between the barbs 64 and the windcord into pierced and anchored engagement with the barbs. It will be seen that the headlining is thus permanently anchored in place, as is the windcord, and that the assembly is effected with a minimum of labor, resulting in an economical manufacture.

Figures 4 to 7 inclusive show the arrangement adjacent the upper end of the front door 11 but it will be understood that the arrangement adjacent the upper edge and rear quarter edge of the rear door 12 is similar.

It will be understood that the invention is not to be limited to the exact construction shown and described, but that various changes and modifications may be made without departing from the spirit and scope of the invention, as defined in the appended claim.

What is claimed is:

In a vehicle body construction, a structural body member having a vertical flange extending laterally inwardly along a door opening, a second structural body member having a vertical body portion extending longitudinally of the vehicle body along the inner side thereof and an integral laterally inwardly extending vertical flange positioned adjacent and secured to the laterally inwardly extending vertical flange of said first body member, a plurality of vertically spaced tabs struck out from the body portion of said second body member, a windcord having an enlarged resilient sealing portion and a smaller beaded portion spaced from said sealing portion and connected thereto by flexible webbing, the sealing portion of said windcord being positioned adjacent said flanges on the side toward said door opening and the beaded portion being positioned adjacent said flanges on the opposite side thereof with said flexible webbing resting against the marginal edges of the flanges, and a continuous metal clamping strip having a body portion formed with holes registering with said tabs so that said tabs may project therethrough and be bent over to hold the body portion of said strip in place against the body portion of said second body member, said clamping strip also having an inwardly offset integral flange extending generally parallel to the body portion of said strip and extending adjacent the marginal edges of the inwardly extending flanges of said body members and engaging the webbing of said windcord to clamp the latter to the flanges against displacement, said clamping strip forming the sole retaining means for said windcord, the inwardly offset flange of said clamping strip having a return bent rolled end portion adjacent the marginal edges of the inwardly extending flanges of said body members and engaging and supporting the enlarged resilient sealing portion of said windcord, and a vertical trim panel extending generally longitudinally of the vehicle body and having its vertical edge portion seated in the return bent rolled end portion of the inwardly offset flange of the clamping strip.

References Cited in the file of this patent

UNITED STATES PATENTS

| Number | Name | Date |
|---|---|---|
| 1,896,632 | Ledwinka | Feb. 7, 1933 |
| 2,051,757 | Travis | Aug. 18, 1936 |
| 2,356,976 | Conlon | Aug. 29, 1944 |
| 2,383,575 | Wernig | Aug. 28, 1945 |
| 2,536,863 | Widman | Jan. 2, 1951 |

FOREIGN PATENTS

| Number | Country | Date |
|---|---|---|
| 541,917 | Great Britain | Dec. 17, 1941 |
| 864,869 | France | Feb. 3, 1941 |